May 21, 1929.  H. E. HALE  1,714,022
DAMPER SPRING FOR PIANO ACTIONS
Filed March 25, 1926
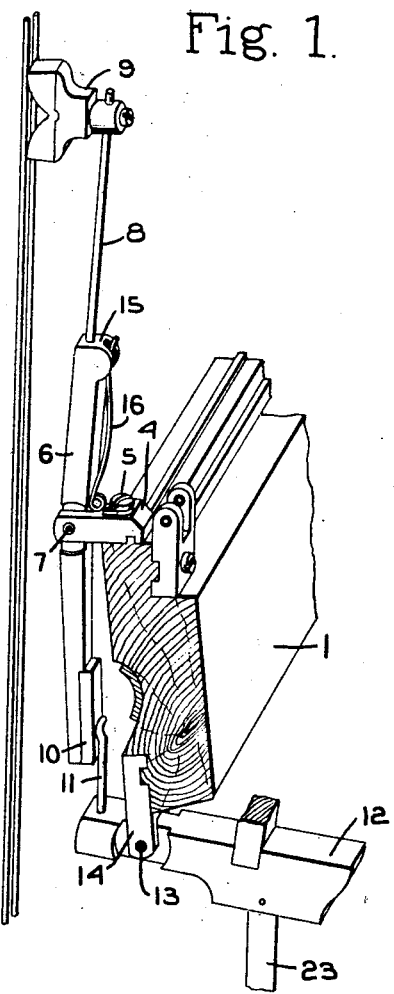
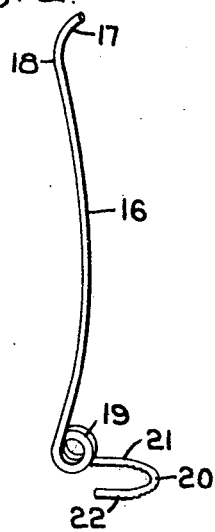
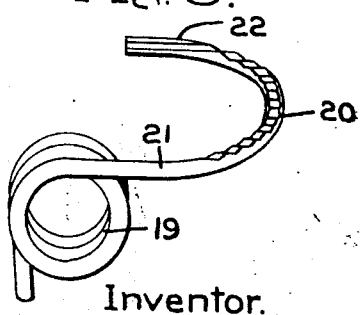
Inventor.
Harold E. Hale
by Heard Smith & Tennant
Attys Patented May 21, 1929.

1,714,022

UNITED STATES PATENT OFFICE.

HAROLD E. HALE, OF SOMERVILLE, MASSACHUSETTS.

DAMPER SPRING FOR PIANO ACTIONS.

Application filed March 25, 1926. Serial No. 97,160.

This invention relates to improvements in damper mechanisms for piano actions and the object thereof is to provide a damper mechanism having an improved type of spring which can be more readily constructed, assembled and replaced than in previous constructions.

A further object of the invention is to provide a repair spring for dampers which can be readily employed by a tuner to replace a broken damper spring of the usual type.

In usual types of piano actions the damper spring comprises a curved shank having a reversely curved free end portion which engages the damper lever and at its opposite end a coil with a short free end extending therefrom. The coiled end of the damper spring is seated in a recess in the damper lever supporting flange which is secured to the action rail of the piano. A pintle, usually of cord having a braided casing, felt, or other fibrous material, passes through the eye of the coil of the damper spring and is seated in the walls of the recess in which said coil is located and thereby forms a pivotal support for the spring. The short free end of the spring, which extends from the coil, rests upon the wall of the recess and extends from the coil at such an angle as to cause the spring normally to tend to press upon the damper lever sufficiently to cause the damper to engage the string or strings of the piano. In repairing pianos such damper springs are frequently found to be broken and in order to replace the same it is necessary to remove the damper flange and the damper lever, then to dig out the pintle, replace the spring and pintle and reassemble the parts. In the absence of special machinery it is difficult to remove the pintle from the hinge and replace it and in doing so the tuner frequently will break the flange, thus requiring replacement of the flange and usually resulting in the more convenient replacement of the damper, damper lever and flange.

By the present invention a broken damper spring may be quickly replaced without the necessity of removing the damper lever flange from its position. Furthermore, the construction of the novel damper spring is such that it can be more economically employed in the manufacture of pianos than the old types of spring.

Other objects and features of the invention will more fully appear from the following description and the accompanying drawing and will be particularly pointed out in the claims.

In the drawing:

Fig. 1 is a perspective view of a portion of a piano action showing particularly the damper mechanism;

Fig. 2 is a perspective view of a preferred form of damper lever spring embodying the present invention; and, Fig. 3 is an enlarged detail showing the foot portion of the damper lever spring in inverted position to illustrate more clearly the flattened ribbed base thereof which engages the support for the spring.

Inasmuch as the present invention relates only to the damper mechanism for piano action, only a sufficient portion of the mechanism of the action is illustrated to show the relation of the invention thereto. This portion of the piano action which is illustrated in the drawing comprises the usual action rail 1 having at its upper edge a flat surface provided with an upwardly extending rib or tenon upon which surface and rib the damper lever flange 4 is mounted and secured thereto by a screw 5, the under surface of the head of which presents a flat shoulder. The flange 4 has a bifurcated end between the arms of which the damper lever 6 is pivotally mounted upon a suitable pintle 7.

The body of the damper lever is illustrated herein as of wood with a rod 8 extending from the upper end thereof. The damper head 9 is adjustably mounted upon the rod 8 in the usual manner. The lower end of the damper lever is provided with a cushion 10 which is engaged by the damper spoon 11 carried upon the end of the wippen 12 which is pivotally mounted upon a pintle 13 in the usual wippen flange 14 which is secured to and extends downwardly from the action rail 1.

The upper end of the wooden portion of the damper lever 6 is provided with a laterally extending slotted boss 15 the walls of the slot of which are felt-lined and adapted to be engaged by the curved end portion of the damper spring. The novel damper spring, which is illustrated herein, comprises a curved shank 16, preferably of wire, the free end portion 17 of which is reversely curved to present a convex face 18 slidably to engage the felt-lined wall of the slot in the boss 15 of the damper lever. The wire desirably, but not necessarily, is bent at the lower end of the shank 16 into a coil 19 to accentuate the action of the spring and the end of the wire spring is carried laterally from said coil and is bent to present a curved, preferably a U-shaped foot portion 20 to embrace the shank of the screw 5 and adapted to be clamped by the head of said screw upon the upper surface of the damper lever flange 4. Desirably the foot portion 20 is flattened by swaging, rolling, or otherwise, and the lower face thereof is roughened to provide means to penetrate the surface of the wood of the damper lever flange when it is clamped thereupon by the screw 5. Desirably the roughened under face of the foot portion comprises ribs which extend in the direction of the arms 21 and 22 of the U-shaped foot portion as such ribs will extend in the direction of the grain of the damper lever flange when the spring is secured thereupon by the screw 5. The ribs will, therefore, become more easily embedded in the wood than if these ribs extended in a direction transversely of the grain.

By reason of the construction above described a broken damper spring can be very readily replaced as it is only necessary for the tuner, or other repair man, to loosen up the screw 5 sufficiently to enable him to insert the U-shaped foot 20 of the damper spring beneath the head of the screw, then twist the damper spring around the shank of the screw until the spring is in its proper position with its free end resting in the groove of the damper lever and thereupon setting up the screw 5 so that the foot 20 of the damper spring will be clamped firmly between the shoulder of the head of the screw and the upper face of the damper lever flange 4. When the screw 5 is thus set up the ribs on the under face of the foot portion of the damper spring will become embedded in the wood of the flange and the possibility of displacement of the damper spring will be avoided.

In thus replacing a broken damper spring it is unnecessary for the tuner to remove the coil of the original spring from the damper lever flange. Consequently, such repair can be made without removing the damper lever and its flange from its original position. The novel damper spring may, of course, be employed in the original construction of the piano and in such case will be applied in the manner above described, thus avoiding the necessity of providing a recess for the coil of the spring in the damper flange and also avoiding the insertion of the fibrous pivot for the damper spring. Inasmuch as a damper is provided for each note it will be obvious that considerable time and labor will be saved in the original construction of the piano action by the use of this novel spring.

When the parts are assembled as above described the action is operated in the usual manner by the depression of a key (not shown) acting through the usual sticker 23 to rock the wippen 12 about its pivot 13, thereby raising one end thereof through which the hammer mechanism (not shown) is actuated and at the same time depressing the other end of the wippen, thereby causing the damper spoon 11 to rock the damper lever 6 about its pivot 7 against the action of the damper spring 16 and removing the damper from the springs before the hammer impinges upon them. The action of the damper spring of the present invention is the same as that of usual damper springs with the exception that it is much more easily assembled and replaced and is more firmly anchored than in previous constructions.

It will be understood that the embodiment of the invention particularly disclosed herein is of an illustrative character and is not restrictive and that various changes in form, construction and arrangement of parts may be made within the spirit and scope of the following claims.

Having thus described the invention, what is claimed as new, and desired to be secured by Letters Patent, is:

1. Damper mechanism for piano actions comprising an action rail, a damper lever flange, a screw securing the same to said action rail, a damper lever pivotally mounted upon said flange and a damper spring having a shank presenting a free end portion slidably and removably engaging said damper lever and a foot resting upon and secured to said flange by said screw and forming the only anchorage for said damper spring, whereby said damper spring may be removed and replaced by merely loosening or withdrawing said screw.

2. Damper mechanism for piano actions comprising an action rail, a damper lever flange, a screw securing the same to said action rail, a damper lever pivotally mounted upon said flange, a wire damper spring having a shank presenting a free end portion slidably and removably engaging said damper lever and a laterally extending U-shaped foot portion curved to embrace the shank of said screw beneath the head thereof and clamped upon said flange thereby and having means to penetrate the surface of the flange when clamped thereupon by said screw.

3. Damper mechanism for piano actions comprising an action rail, a damper lever flange, a screw securing the same to said action rail, a damper lever pivotally mounted upon said flange, a wire damper spring having a shank presenting a free end portion slidably and removably engaging said damper lever and coiled at the opposite end of said shank and a foot portion extending laterally from said coil curved to embrace the shank of said screw beneath the head thereof and clamped upon said flange thereby and forming the only anchorage for said damper spring, whereby said damper spring may be removed and replaced by merely loosening or withdrawing said screw.

4. Damper mechanism for piano actions comprising an action rail, a damper lever flange, a screw securing the same to said action rail, a damper lever pivotally mounted upon said flange, a wire damper spring having a shank presenting a free end portion slidably engaging said damper lever and a laterally extending foot portion curved to embrace the shank of said screw beneath the head thereof and having a ribbed surface engaging said flange acting to prevent lateral movement of said foot portion when the latter is clamped upon said flange.

5. Damper mechanism for piano actions comprising an action rail, a damper lever flange, a screw securing the same to said action rail, a damper lever pivotally mounted upon said flange, a wire damper spring having a shank presenting a free end portion slidably engaging said damper lever and coiled at the opposite end of said shank and a flattened U-shaped foot portion extending laterally from said coil presenting upon its under face ribs extending in the general direction of the arms of said extension and in the direction of the grain of the wood of said flange.

6. A damper spring for piano actions and the like comprising a shank having a free end presenting a convexedly curved portion slidably to engage the damper lever and a hooked, U-shaped foot extending from the lower end thereof in a direction substantially perpendicular to said shank.

7. A damper spring for piano actions comprising a wire shank having a free end portion presenting a convexedly curved bearing slidably to engage the damper lever, and having a coil at its opposite end with a U-shaped foot portion extending therefrom in a direction substantially perpendicular to said shank.

8. A damper spring for piano actions and the like comprising a wire shank having a free end portion presenting a convexedly curved bearing slidably to engage the damper lever, and having a coil at its opposite end with a U-shaped foot portion extending therefrom presenting a roughened low flat face.

9. A damper spring for piano actions and the like comprising a wire shank having a free end portion presenting a convexedly bearing curved slidably to engage the damper lever, and having a coil at its opposite end with a U-shaped foot portion extending therefrom in a direction substantially perpendicular to said shank and having a series of parallel ribs extending in the direction of the length of the arms of said U-shaped foot.

In testimony whereof, I have signed my name to this specification.

HAROLD E. HALE.